(12) United States Patent
Asthana et al.

(10) Patent No.: US 7,524,447 B2
(45) Date of Patent: Apr. 28, 2009

(54) METHOD FOR MANUFACTURING FORMABLE THERMOPLASTIC LAMINATES

(75) Inventors: Himanshu Asthana, Evansville, IN (US); M. Shoen Davis, Mt. Vernon, IN (US); Hari K. Harikumar, Bangalore (IN); Martin J. Lindway, Waxhaw, NC (US); Aniruddha Moitra, Kolkata (IN); Chetan J. Parikh, Newburgh, IN (US); Om Prakash, Bangalore (IN); Michael T. Roland, Evansville, IN (US); Robert A. Schiff, Evansville, IN (US); Robert W. Walker, Mt. Vernon, IN (US); Georgios S. Zafiris, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 825 days.

(21) Appl. No.: 10/895,522

(22) Filed: Jul. 20, 2004

(65) Prior Publication Data
US 2006/0017193 A1 Jan. 26, 2006

(51) Int. Cl.
*B29C 47/06* (2006.01)
*B29C 47/90* (2006.01)

(52) U.S. Cl. .................. 264/173.12; 264/173.14; 264/173.15; 264/173.19; 264/174.1; 264/260; 425/133.5; 425/328; 425/363

(58) Field of Classification Search ............ 264/173.11, 264/173.12, 173.13, 173.14, 173.15, 173.19, 264/174.1, 260, 310; 425/133.5, 328, 363
See application file for complete search history.

(56) References Cited

U.S. PATENT DOCUMENTS 4,390,683 A 6/1983 Yatsu et al.
4,500,603 A 2/1985 Freundlich (Continued)

FOREIGN PATENT DOCUMENTS

EP 1 316 419 A2 6/2003

(Continued)

OTHER PUBLICATIONS

International Search Report ; International Application No: PCT/US2005/025191; International Filing Date Jul. 15, 2005/ Applicant's File Reference 08SL 139302; Date of Mailing Nov. 9, 2005; 6 pages.

*Primary Examiner*—Robert B Davis
*Assistant Examiner*—Joseph Leyson
(74) *Attorney, Agent, or Firm*—Cantor Colburn LLP

(57) ABSTRACT

One method for making a laminate material comprising a first surface layer comprising resorcinol arylate polyester chain members and a second surface layer suitable for bonding to a substrate, comprises co-extruding a polymeric first surface layer material and a polymeric second surface layer material through a die and into the first nip of a calender roll stack comprising a first surface roll and a second surface roll that define the first nip, to form the laminate material. A nip load in the first nip of greater than or equal to about 400 N/cm can be applied to the laminate, and the laminate material can be collected from the roll stack. The first roll and the second roll can each have a surface smoothness of less than or equal to about 5 micrometers and temperatures of about 40° C. to about 150° C.

37 Claims, 4 Drawing Sheets

U.S. PATENT DOCUMENTS

| | | |
|---|---|---|
| 4,695,239 A | 9/1987 | Klepsch et al. |
| 4,731,213 A | 3/1988 | Klepsch |
| 4,931,364 A | 6/1990 | Dickinson |
| 5,009,952 A | 4/1991 | Klepsch et al. |
| 5,439,628 A * | 8/1995 | Huang ................. 264/175 |
| 6,306,507 B1 | 10/2001 | Brunelle et al. |
| 6,572,956 B1 | 6/2003 | Pickett et al. |
| 2002/0114922 A1 | 8/2002 | Bourne et al. |
| 2002/0197438 A1 | 12/2002 | Hay et al. |
| 2003/0008164 A1 | 1/2003 | Klepsch |
| 2003/0031847 A1 * | 2/2003 | Numrich et al. ............ 428/215 |
| 2003/0175488 A1 | 9/2003 | Asthana et al. |
| 2004/0154734 A1 * | 8/2004 | Akada et al. ........... 156/244.11 |

FOREIGN PATENT DOCUMENTS

| | | |
|---|---|---|
| WO | WO 96/07541 | 3/1996 |
| WO | WO 99/02339 | 1/1999 |
| WO | WO 02/090109 A1 | 11/2002 |
| WO | WO 03/047857 A1 | 6/2003 |

* cited by examiner

METHOD FOR MANUFACTURING FORMABLE THERMOPLASTIC LAMINATES

FIELD OF INVENTION

The present disclosure relates to a method for the manufacture of multi-layer thermoplastic laminate having good adhesion to substrates, especially foamed substrates.

BACKGROUND OF THE INVENTION

Many automobile components and vehicle body panels are molded of thermoformable compositions such as thermosetting polymer compositions. However, the automotive industry generally requires that all surfaces visible to the consumer have 'Class A' surface quality. At a minimum, such surfaces must be smooth, glossy, and weatherable. Components made of thermoformable compositions often require extensive surface preparation and the application of a curable coating to provide a surface of acceptable quality and appearance. The steps required to prepare such a surface may be expensive and time consuming and may affect the mechanical properties of the thermoset materials.

Although the as-molded surface quality of thermoformable components continues to improve, imperfections in their surfaces due to exposed glass fibers, glass fiber read-through, and the like often occur. These surface imperfections may further result in imperfections in coatings applied to such surfaces. Defects in the surface of thermoformable compositions and in cured coatings applied to the surfaces of thermoformable compositions may manifest as paint popping, high long- and short-term wave scan values, orange peel, variations in gloss or the like.

Several techniques have been proposed to provide thermoformable surfaces of acceptable appearance and quality. For example, overmolding of thin, preformed paint films may provide a desired Class A surface. However, such overmolding is usually applicable only for those compositions capable of providing virgin molded surfaces that do not require any secondary surface preparation operations. Although 'as-molded' surface quality has improved, as-molded surfaces of component parts continue to need sanding, especially at the edges, followed by sealing and priming prior to painting. In-mold coating can obviate these operations, but only at the cost of greatly increased cycle time and cost. Such processes use expensive paint systems that may be applied to the part surface while the mold is re-opened slightly, and then closed to distribute and cure the coating.

Surface improvements have also been obtained by the addition of low profile additives. Such additives reduce the "read-through" at the surface by causing minute internal voids due to the high stresses and provide a smoother surface. If the void occurs at the surface however, a defect may result in the finish. The voids also act as stress concentrators, which may cause premature failures under additional stress or may appear at the surface during the general sanding and leave a pit that the painting process cannot hide.

Thermoformable multi-layer laminates are known in the vehicular arts as providing acceptable surface preparation when applied to various automobile components without distorting the quality of the underlying surface or substrate. However, prior art laminates have known to show inter-layer or intra-layer separations, including separations from substrates bonded to the laminates. Moreover, the various layers of the multi-layer laminate compositions may adhere unevenly to each other and/or the surface or substrate to which they are applied. This can result in unacceptable surface qualities in the finished automotive part.

Multi-layer laminates have traditionally been formed in a variety of methods, including co-injection molding, overmolding, multi-shot injection molding, sheet molding, co-extrusion, placement of a film of coating layer material on the surface of a substrate layer, and the like. Co-extrusion methods are especially desirable. Multi-layer laminates formed by co-extrusion are advantageous economically and generally exhibit improvements in cohesion and adhesion relative to the various layers making up the multi-layer laminate. However, some multi-layer laminate compositions are difficult to form by co-extrusion. Thus, it has been difficult to provide formable multi-layer laminates that have a desirable balance of properties with respect to adhesion to a substrate and surface quality but are also able to be co-extruded.

Therefore, there continues to be a need for a method for manufacturing thermoformable multi-layer laminate compositions that more effectively adheres to a substrate surface and provides desirable surface quality.

SUMMARY OF INVENTION

Disclosed herein is a method for the production of a laminate material comprising a first surface layer comprising resorcinol arylate polyester chain members and a second surface layer suitable for bonding to a substrate. In one embodiment, the method comprises co-extruding a polymeric first surface layer material and a polymeric second surface layer material through a die and into the first nip of a calender roll stack comprising a first surface roll and a second surface roll to form the laminate material, and collecting the laminate material from the roll stack, wherein the first surface layer comprises a material having a cleanliness level that yields less than or equal to about 190 particulates per square foot (about 2050 particulates per square meter) in the first surface layer of the laminate, the defects having an average size (measured along the major axis of each defect) of less than or equal to about 350 μm, and wherein the first roll and the second roll each have a surface smoothness of less than or equal to about 5 micrometers (200 micro-inches) and temperatures of about 40° C. to about 150° C. (about 100° F. to about 300° F.), and applying a nip load in the first nip of greater than or equal to about 400 N/cm (about 230 lb/inch).

The above-described and other features are exemplified by the following Figures and detailed description.

BRIEF DESCRIPTION OF THE DRAWINGS

Refer now to the figures, which are exemplary embodiments, and wherein the like elements are numbered alike.

DETAILED DESCRIPTION OF THE INVENTION

Figure 1:
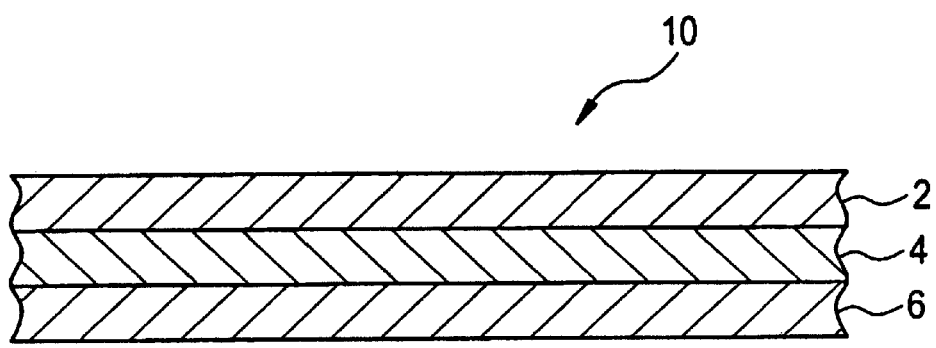
FIG. 1 is a cross-sectional view of one embodiment of the disclosed multi-layer laminate.

The method disclosed herein can be used to produce a laminate comprising at least two layers of material that define the two opposite laminate surfaces, i.e., a first surface layer and a second surface layer. The laminate may find use in providing a desired surface for a substrate to which the laminate may be applied. Optionally, the method may be employed to provide a laminate comprising one or more middle layers between the second surface layer and the first surface layer. The terms "first," "second," and the like, herein do not denote any quantity, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., ranges of "up to about 25 wt %, with about 5 wt % to about 20 wt % desired," is inclusive of the endpoints and all intermediate values of the ranges of "about 5 wt % to about 25 wt %," etc.).

The first surface layer may provide a superior quality surface, i.e., one having fewer brushlines, die lines or any other lines, and/or fewer point defects such as pinholes, voids, gels, black specs, etc., before and after thermoforming the laminate onto a substrate, than was attained with laminates made according to other methods. The second surface layer provides a surface to be bonded to a substrate and may be known as a "tie-layer". In one embodiment, the method described herein may be used to produce a laminate that provides a Class 'A' surface to the substrate. As used herein, the term "Class A surface" refers to a surface substantially free of visible defects such as hair-lines, pin-holes, and the like. In one embodiment, a Class A surface may provide a gloss of about 100 units or more at either about 20 degrees or about 60 degrees, a wavescan value of less than or equal to about 5 units (long as well as short), and a distinctness of image (DOD) of greater than or equal about 95 units. A wavescan instrument made by BYK corp. is widely used in the art for making these measurements.

Upon application to a substrate, the multi-layer laminate maintains the surface quality of the substrate and provides an article having a desirable surface appearance and quality. In one embodiment, the laminate comprises less than or equal to about 500 surface defects (i.e., particulates, pinholes, voids, gels, black specs, etc.) per square meter of laminate (per 37 square feet), wherein the defects have an average size (measured along the major axis of the each defect) of less than or equal to about 2 millimeters (mm). In one embodiment, the laminate has less than or equal to about 400 surface defects per square meter of the laminate, wherein the defects have an average size of less than or equal to 0.3 mm (measured along the major axis of each defect), and, optionally, less than or equal to about 54 surface defects per square meter of laminate, wherein the defects have an average size of about 0.3 to about 2 mm (measured along the major axis of each defect), or, more specifically, no surface defects having an average size greater than 2 mm (measure along the major axis of each defect). Most desirably, the first layer may be free of brushlines, die lines and/or any other lines, and/or may be free of point defects.

The method may be carried out as a co-extrusion process wherein at least two layers of the laminate are simultaneously extruded through a sheet or film die orifice that may be of a single manifold or multi-manifold design. While still in the molten state, the layers are laminated together and then compressed together into a film by being passed through the nip of a pair of rolls in a calender roll stack. The roll stack may have a two-roll or three-roll configuration, and may be configured as an L-shaped, vertical or inclined roll stack providing one, two, or more, nips. A device used to pin the molten film down on the first roll (such as an air-knife, vacuum box, or air-jets) could be attached at the roll stack. Optionally, the film passes from the calender to a masking application station, and a finishing station where the laminate film is collected. If the second surface layer is not coextruded with the other layers, it is laminated to the other layers in a secondary operation before the laminate passes to the finishing station. The finishing station may optionally comprise slitters, guillotine shear, corona, and/or flame treatment, and a film transfer mechanism.

Generally, and subject to the broader description provided herein, some embodiments of the first surface layer, and, optionally, the second surface layer, comprise a polycarbonate or polycarbonate copolymer or blend comprising resorcinol arylate polyester chain members, and may optionally comprise iso-terephthalic resorcinol/polycarbonate copolymer.

Alternatively, the second surface layer may comprise polycarbonate, polycarbonate blended with an acrylonitrile-styrene graft copolymer (e.g., acrylonitrile-styrene-acrylate graft copolymer (ASA) and/or an acrylonitrile-butadiene-styrene graft copolymer (ABS)); and/or a blend of two or more of acrylonitrile-styrene-acrylate graft copolymer (ASA), acrylonitrile-butadiene-styrene graft copolymer (ABS) and styrene-acrylonitrile (SAN) copolymers, or other materials, as described elsewhere herein.

Optionally, one or more middle layers may be extruded between the first and second surface layers. The thickness and composition of an optional middle layer or layers may optionally be chosen for an ability to serve one or more functions, such as to bind the second surface layer to the first surface layer (or to bind to one of the first and second surface layers and/or to another middle layer); to provide the desired mechanical properties to the laminate, e.g., stiffness; to act as a carrier for pigment; and/or to provide image depth appearance to the laminate. The middle layer may comprise a polycarbonate or polycarbonate blend that may include one or more materials that may be used in the first layer, and/or one or more other materials as disclosed elsewhere herein.

Optionally, at least one layer in the laminate is pigmented. In particular embodiments, the first surface layer may either be clear (not pigmented) or may be pigmented with a metallic pigment; the other layers, especially layers comprising polycarbonate, may optionally contain metallic or non-metallic pigments.

Turning now to FIG. 1, a sectional view of three-layer laminate 10 produced by one embodiment of this method is shown. The three-layer laminate 10 comprises a first surface layer 2, a second surface layer 6 opposite to the first surface layer 2, and a middle layer 4 disposed between, and in contact with, the first surface layer 2 and second surface layer 6.

In one example embodiment, first surface layer 2 may comprise iso-terephthalic resorcinol/polycarbonate copolymer. First surface layer 2 may have a thickness sufficient to maintain its integrity upon subsequent processing, e.g., to avoid cracking or forming channels when the laminate is molded onto a substrate. For example, first surface layer 2 may have a thickness of about 0.08 mm to about 0.51 mm (about 0.003 inch to about 0.02 inch), optionally about 0.1 mm to about 0.25 mm (about 0.004 inch to 0.010 inch), e.g., 0.175 mm (0.0069 inch). (All ranges disclosed herein are inclusive and combinable (e.g., the disclosures of about 0.08 mm to about 0.51 mm and of about 0.1 mm to about 0.25 mm includes the ranges of about 0.08 mm to about 0.25 mm and about 0.1 mm to about 0.51 mm), etc. The same applies to ranges of thicknesses, temperatures, pressures, etc.) In one embodiment, the weight average molecular weight of iso-terephthalic resorcinol/polycarbonate copolymer in the first surface layer may be about 19,000 g/mole to about 30,000 g/mole. The melt flow index of the first surface layer material may be about 20 cubic centimeters per 10 minutes ($cm^3/10$ min) to about 2 $cm^3/10$ min (measured at 300° C./1.2 kg).

Figure 2:
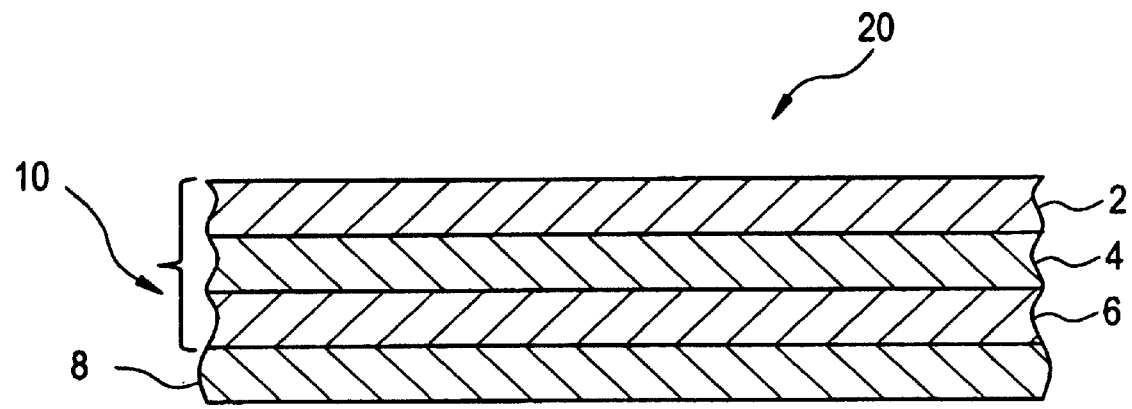
FIG. 2 is a cross-sectional view of one embodiment of a formed article comprising the multi-layer laminate of FIG. 1 bonded to a substrate.
Figure 6:
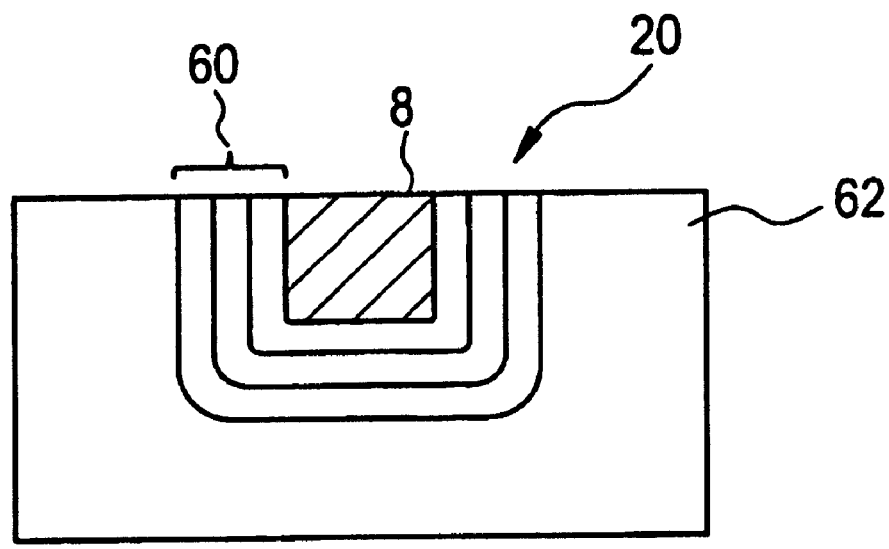

Second surface layer 6 provides adhesion between the multi-layer laminate 10 and a substrate 8 as illustrated in FIG. 2 and FIG. 6. In a representative embodiment, second surface layer 6 comprises a blend of polycarbonate with an acrylonitrile-styrene-acrylate graft copolymer (ASA). Such materials are commercially available under the trademark GELOY™ polycarbonate/ASA from General Electric Advanced Materials of Washington, W.Va. In a second representative embodiment, the second surface layer 6 comprises a blend of polycarbonate with an acrylonitrile-butadiene-styrene graft copolymer (ABS)), a styrene-acrylonitrile (SAN) copolymer and an acrylonitrile-styrene-acrylate graft copolymer (ASA).

Such materials are commercially available under the trademark CYCOLOY™ from General Electric Advanced Materials of Mt Vernon, Ind.

Second surface layer 6 has sufficient thickness to bond the laminate to a substrate. In one embodiment, the second surface layer 6 is typically about 0.08 mm to about 0.8 mm (about 3 mils to about 30 mils) thick, while in another embodiment, the thickness of second surface layer 6 will be about 0.08 mm to 0.3 mm (about 3 mils to 12 mils) thick. In another embodiment, the second surface layer 6 is about 0.08 mm to about 0.15 mm (about 3 mils to about 6 mils) thick, while in another embodiment, the thickness will be about 0.23 mm to about 0.3 mm (about 9 mils to about 12 mils) thick. In yet another embodiment, the thickness may be about 0.13 mm to about 0.8 mm (about 0.005 inch to about 0.03 inch).

In one sample embodiment, the optional middle layer 4 may comprise a polycarbonate material, such as LEXAN® polycarbonate, which is commercially available from GE Advanced Materials Corporation. Middle layer 4 may have a thickness of about 0.25 millimeter (mm) to about 1 mm (about 0.01 inch to about 0.04 inch). In an alternative embodiment, middle layer 4 may comprise a blend of polycarbonate material with a polyester such as, e.g., polyphthalate carbonate (PPC).

Polycarbonate compositions suitable for extrusion processing of multi-layer laminates include those having a weight average molecular weight of about 20,000 grams/mole (g/mole) to about 36,000 g/mole.

For example, a polycarbonate used in second surface layer 6 may have a weight average molecular weight of about 21,000 g/mole to about 31,000 g/mole. The melt flow index of the second surface layer material may be about 2 $cm^3$/10 min to about 50 $cm^3$/10 min, as measured at 260° C./5 kg, per ISO 1133 or ASTM D1238, while in another embodiment, the melt flow index may be about 3 $cm^3$/10 min to about 40 $cm^3$/10 min. In another embodiment, the melt flow index of the second surface layer resin may be about 3 $cm^3$/10 min to about 30 $cm^3$/10 min or, optionally, about 4 $cm^3$/10 min to about 12 $cm^3$/10 min measured at 260° C./5 kg, per ISO 1133 or ASTM D1238.

In some illustrative embodiments, suitable carbonate polymer compositions will have a melt flow viscosity (measured at 300° C./1.2 kg) of about 3 $cm^3$/10 min to about 30 $cm^3$/10 min, while in other embodiments, the carbonate polymer compositions will have a melt flow viscosity of about 3 $cm^3$/10 min to about 26 $cm^3$/10 min.

The melt flow indices of the co-extruded polymers may be about 2 g/10 minutes to about 20 g/10 minutes (at 1.2 kgf/300° C.), e.g., about 4 g/10 minutes to about 15 g/10 min. The average melt temperatures may be about 200° C. to about 290° C. (about 400° F. to about 550° F.), e.g., about 200° C. to about 260° C. (about 400° F. to about 500° F.).

As indicated above, there may be two, three, four, five or more extruders extruding materials into the die 43. Where a melt pipe is employed to deliver resin from an extruder to the die, the shortest melt pipe length possible is preferred. The residence time for resin in the melt pipe may be from less than one minute to about twenty minutes, shorter residence times being preferred.

Figure 3:
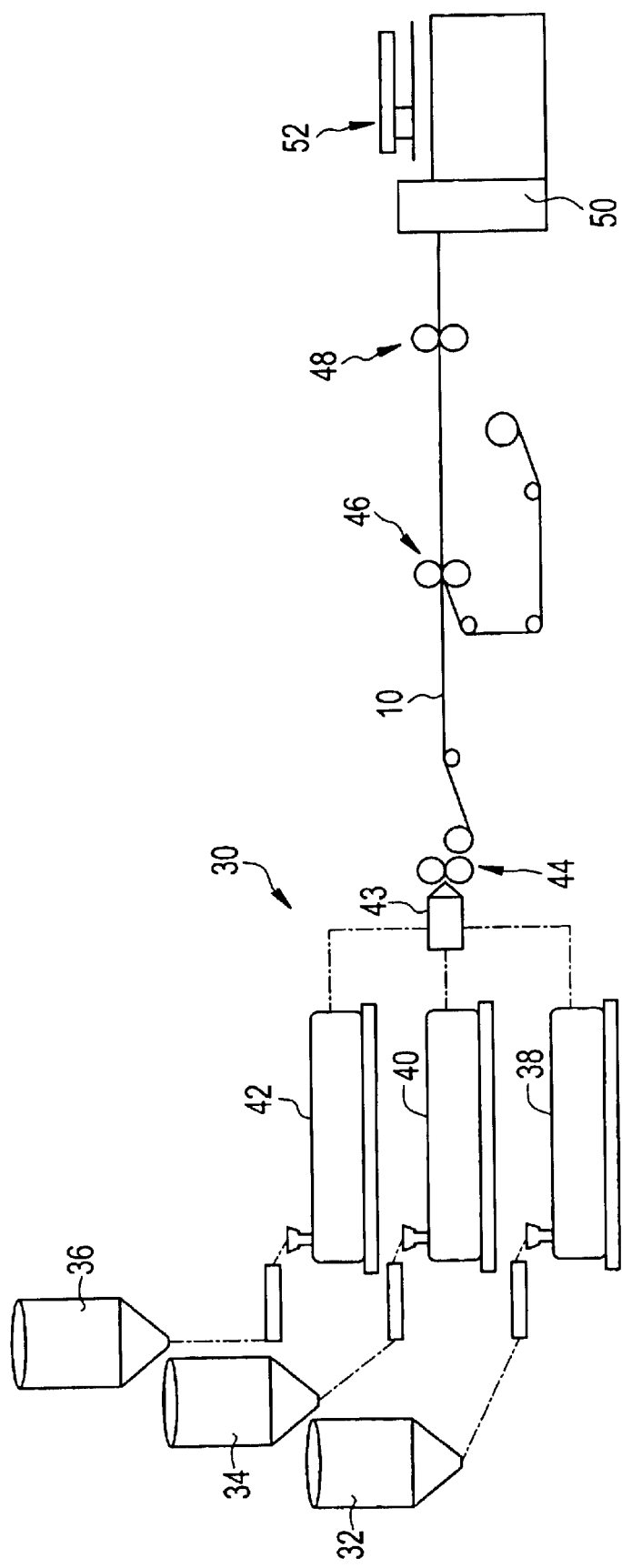
FIG. 3 is a schematic view of one embodiment of a co-extrusion mechanism for forming the multi-layer laminate.
Figure 4:
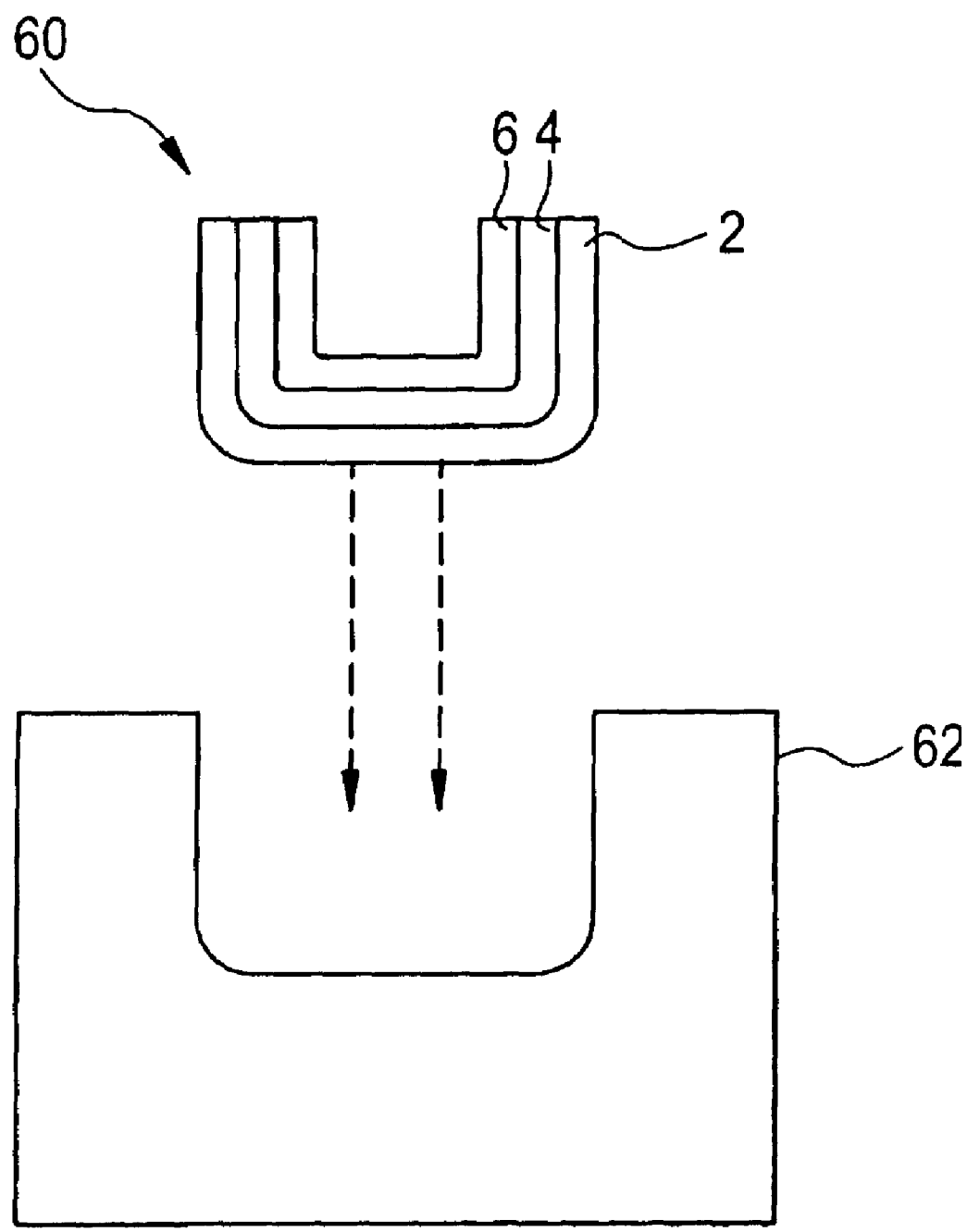
FIGS. 4-6 are sequential cross sectional views illustrating the multi-layer laminate being molded.

As shown in FIG. 3, a multi-layer laminate 10 may be formed by co-extrusion lamination of the layers 2, 4, and 6 (FIG. 1), respectively from an extrusion mechanism 30 comprising hoppers/extruders 32/38, 34/40, and 36/42. The extrusion mechanism 30 comprises a first hopper 32, a second hopper 34, and a third hopper 36 for the transfer of material to a corresponding first extruder 38, second extruder 40, and third extruder 42, respectively. Each hopper and each extruder may be adapted to process compositions of differing extrusion temperatures and viscosities. The extruders may be vented or not vented, and may be of a single or twin screw design. The extruder screws may have a single or two-stage design or, optionally, any combination of single flight, barrier flight, triple wave and Maddock mixer design. The use of so-called "aggressive" extruder screws (e.g., a triple wave screw) did not improve the quality of the surface of the finished product, but simpler screws permitted the production of laminates having Class A surfaces. For example, a single flight screw with a barrier section was found to produce an acceptable first surface layer. A single flight, two-stage screw with vent was found to be useful for a second surface layer material, to permit the release of volatile components from the rubber portion of the second surface layer material.

In one particular two-layer embodiment, the first surface layer comprises iso-terephthalic resorcinol/bisphenol-A-polycarbonate copolymer and the second surface layer comprises polycarbonate.

In particular three-layer embodiments, the first surface layer may comprise iso-terephthalic resorcinol/bisphenol-A-polycarbonate, the middle layer may comprise a polycarbonate/polyester blend that may comprise 20 wt % to 60 wt % polyphthalate carbonate (PPC), based upon the weight of the blend, and the second surface layer may comprise GELOY™ polycarbonate/ASA blend or CYCOLOY™ polycarbonate/ABS blend. One suitable PPC material useful for the laminate has a weight average molecular weight of about 27,500 to 29,500 grams per mole.

The extrusion mechanism 30 can extrude into the three-layer laminate 10 stratified layers of materials having differing melt temperatures. In one exemplary embodiment, mechanism 30 extrudes the resorcinol arylate polyester of the first surface layer material at a melt temperature of about 200° C. to about 290° C. (about 400° F. to about 550° F.), or, more specifically, about 200° C. to about 225° C. (about 440° F. to about 510° F.), and even more specifically, about 230° C. to about 260° C. (about 450° F. to about 500° F.). The molten extruded first surface layer material may be clear, i.e., free of pigment, or it may contain pigment and/or dye additive and/or metallic additives and should have a cleanliness level (as measured by a ribbon count extruder) that yields less than or equal to about 190 particulates per square foot (less than or equal to about 2050 particulates per square meter) in the first surface layer of extruded monolithic film to minimize first surface point defects, the defects having an average size, measured along the major axis of each defect, of less than or equal to about 350 micrometers (μm).

In one embodiment, the second extruder 40 operates to process the thermoplastic polymer comprising a polycarbonate composition of a middle layer at a melt temperature of about 200° C. to about 290° C. (about 400° F. to about 550° F.), or, more specifically, about 215° C. to about 275° C. (about 420° F. to about 530° F.), and even more specifically about 221° C. to about 260° C. (about 430° F. to about 500° F.).

The extruder for the second surface layer, in this case the third extruder 42, operates to extrude the material for the second surface layer having a melt temperature of about 200° C. to about 275° C. (about 400° F. to about 530° F.), or about 215° C. to about 260° C. (about 420° F. to about 500° F.), or optionally about 225° C. to about 250° C. (about 440° F. to about 480° F.). A blend of polycarbonate, acrylonitrile-styrene-acrylate graft copolymer and acrylonitrile-butadiene-styrene graft copolymer may have a melt temperature of about 225° C. to about 260° C. (about 440° F. to about 500° F.). As shown in FIG. 3, the top layer of the laminate comprises the second surface layer and the bottom layer of the laminate comprises the first surface material.

The die 43 may comprise a multi-manifold or a single-manifold die with a selector housing and a feed-block when required, depending on the film construction. To reduce friction and fouling, which adversely affects the surface quality of the film produced, some or all components and channels of the die can be coated with a silicone-based or alternate chemistry coating. The die 43 forms a plurality of layers of the resins, in sheet form. The die feed-block temperature profile may generally be about 255° C. to about 290° C. (about 490° F. to about 550° F.). Optionally, the temperature at the first surface layer side of die 43 is greater than or equal to about 260° C. (about 500° F.), which promotes the attainment of a Class A surface, or, more specifically, less than or equal about 290° C. (about 550° F.). When the second surface layer comprises a blend of polycarbonate, acrylonitrile-styrene-acrylate graft copolymer and acrylonitrile-butadiene-styrene graft copolymer, the temperature provided on that side of the die can be greater than or equal about 260° C. (about 500° F.), as such temperatures have been found to promote adhesion of the second surface layer to a polyurethane substrate.

A uniform die gauge profile has been found to produce a laminate of uniform width. When the first surface layer is on the bottom of the laminate, a frown-face profile reduces point defects in the surface of the finished laminate. The die lip opening is generally greater than or equal to about 0.8 mm (about 0.03 inch) wide. For a laminate having a thickness of about 1.3 mm (about 0.05 inch), the die lip opening may be about 0.8 mm to about 3 mm (about 0.03 to about 0.12 inch) wide.

The laminate 10 of the stratified extrudate materials is passed from die 43 to a calender roll stack 44 for compression. The die may be distanced from the first nip of the calender roll stack in one or two mutually perpendicular directions. The "line in/out distance" is a distance from the die lip to the first calender nip in a first direction, i.e., a direction perpendicular to the plane containing the longitudinal axes of the first two rolls. The line in/out distance is optionally less than or equal about 10 inches and may be about 5 to about 25 cm (about 2 to about 10 inches), optionally about 5 cm to about 13 cm (about 2 to about 5 inches). The "line height" is a distance in a second direction, the second direction being parallel to the plane containing the longitudinal axes of the first two rolls and perpendicular to the first direction. The line height is the distance in the second direction from the die lip to the plane extending through the nip in the first direction. Optionally, the line height may be about 1.3 cm to about 5 cm (about 0.5 inch to about 2 inches). The die may optionally be at line height to position it in line with the upper roll (i.e., the first roll) when the first surface layer of the laminate is on the bottom (i.e., so that the first surface layer is in contact with the second (lower) roll), to reduce the contact of the first surface layer with the second roll before the laminate enters the nip.

The layers of the laminate are compressed by calender roll stack 44 into suitable form as a multi-layer laminate 10. In the illustrated embodiment, roll stack 44 is a three-roll, L-shaped roll stack that provides two calender nips. The roll of the first nip that contacts the first surface layer of the laminate is referred to herein as the 'first surface roll'. As seen in FIG. 3, the first surface roll is the lower of the two rolls in the first nip. The roll of the first nip that is in contact with the second surface layer is the second surface roll (the upper roll of FIG. 3).

The first calender nip may be defined by any combination of metal or soft rolls, and the second calender nip may be defined by any combination of metal or soft rolls. When metal rolls are used, they can either be polished or matte steel rolls, optionally chrome-plated and optionally having surface smoothness of less than about 0.013 micrometer to about 5 micrometers (about 0.5 micro-inch to about 200 micro-inches). Steel rolls can yield a laminate having a Class A surface, where softer rolls often do not. When used, soft rolls can be made of a variety of materials softer than steel (e.g., silicon rubber) with surface smoothness of less than or equal about 5 micrometers (about 200 micro-inches), e.g., about 0.013 micrometer to about 5 micrometers (about 0.5 micro-inch to about 200 micro-inches).

The rolls of roll stack 44 can either be crowned, to compensate for deflection due to their weight and load, or they may be flat. Flat rolls are acceptable for making laminates having a thickness of about 1.3 mm (about 0.05 inch) or more; crowned rolls are preferred for thinner laminates. Generally, crowning may provide up to about 1.3 mm (about 0.05 inch) roll deflection compensation; typically, rolls are crowned by about 0.05 mm to about 0.25 mm (about 0.002 inch to about 0.01 inch). The rolls forming a nip may be crowned different from one another. For example, for a laminate having a thickness of about 0.8 mm (about 0.03 inch), the first roll may have a crown deflection of about 1 mm (about 0.04 inch) and the second crown may have a crown deflection of about 0.25 mm (about 0.01 inch).

The pressure applied to the laminate by the rolls of the first calender nip (i.e., the nip load) may be about 400 Newtons/centimeter (N/cm) to about 2,600 N/cm (about 230 pound force per inch (lb$_f$/in) to about 1,500 lb$_f$/in) and the linear pressure on the second calender nip may be 0 N/cm (open nip) to about 2,600 N/cm (about 0 lb$_f$/in to about 1,500 lb$_f$/in). Surprisingly, it has been found that the nip load in the first nip has a significant affect on the surface quality of the laminate. To attain a Class A surface, a load of about 875 N/cm to about 1,750 N/cm (about 500 lb$_f$/in to about 1,000 lb$_f$/in) is needed. In particular embodiments, the nip load may be about 875 N/cm to 1,050 N/cm (about 500 lb$_f$/in to about 600 lb$_f$/in). If a third roll is used to provide a second nip, the nip load at the second nip may be 0 (open nip) to about 2,600 N/cm (about 1,500 lb$_f$/in).

In one embodiment, the second surface roll (i.e., the uppermost roll, as seen in FIG. 3) may have a diameter of about 30 cm (about 12 inches); the first surface roll (i.e., the roll cooperating with the second surface roll to define the first nip) may have a diameter of about 40 cm (about 16 inches). The line speed may be about 1 meter per minute (m/min) to about 3.5 m/min (about 3 feet per minute (ft/min) to about 11 ft/min), optionally about 1 m/min to about 1.5 m/min (about 3 ft/min to about 5 ft/min), with an extrudate flow rate of about 300 lbs/hour to about 1000 lbs/hour (about 110 kg/hour to about 375 kg/hour), optionally about 400 lbs/hour to about 600 lbs/hour (about 150 kg/hour to about 225 kg/hour). In one embodiment, a laminate having a thickness of about 1.3 mm (about 0.05 inch) may be made with a line speed of about 1.2 m per minute (about 4 feet per minute) and an extrudate flow rate of about 450 lbs/hr (179 kg/hr).

The rolls may optionally run at relative speed ratios of 1:1 to 1.2:1, optionally 1.03:1 to 1.06:1. When the roll speeds are not the same, either may be the faster roll; or, more specifically, the second surface roll can be the faster roll. The speed differential promotes the gloss and class-A quality of the first surface. In a three roll stack, the third roll may turn freely, being turned by the web or driven by a motor.

The web tension as the laminate is drawn from the roll stack may be based on a pull velocity ratio of about 0.9:1 relative to the slower roll in the first nip, to accommodate shrinkage in the laminate as it comes off the roll stack, as this reduces brushlines in the post-thermoformed part. In one embodiment, one or more infrared (IR) heaters may be situated at the exit of the calender stack to anneal the laminate film and release film stresses, which otherwise may result in die lines and brushlines appearing after thermoforming, as well as in sheet warpage. One suitable kind of heater is an IR heater capable of providing up to about 8700 Joules per square meter of laminate. In one embodiment, an IR heater rated for 240 watt output may be positioned about 3 to about 7 inches (about 7.6 to about 17.8 cm) from the laminate, and may operate at a heater load of about 10 percent to about 70 percent of its rated output.

Generally, the total thickness of the multi-layer laminate 10 is about 0.5 mm to about 5 mm (about 20 to about 200 mils). In one exemplary embodiment, the multi-layer laminate 10 is about 0.8 mm to about 1.4 mm (about 30 mils to about 55 mils) thick.

The roll temperatures in roll stack 44 may be about 40° C. to about 150° C. (about 100° F. to about 300° F.). In a particular embodiment, the first surface roll may be at a temperature below the glass transition temperature ($T_g$) of the first surface layer material, e.g., below the $T_g$ of iso-terephthalic resorcinol/polycarbonate copolymer in the first surface layer. For example, the first surface roll may have a temperature of less than or equal about 130° C. (about 265° F.), optionally less than or equal about 115° C. (about 240° F.).

The second surface roll comes in contact with the second surface layer and optionally has a temperature of less than or equal about 90° C. (about 200° F.), above which brushlines appear in the laminate and other defects occur when the laminate is applied to a substrate. The second surface roll is thus colder than has been used in the prior art.

Without wishing to be bound by any particular theory, it is believed that if the rolls in the first nip are hot, i.e., above the glass transition temperatures of the materials they are in contact with, the laminate will not be allowed to cool before tension is applied to the web. When the hot laminate is subjected to tension, molecules therein may be forced into ordered configurations, e.g., lamella, fringed micelles, localized crystalline regions, etc., which configurations may be maintained upon cooling. Later, the laminate is subjected to heat as it is applied to a substrate without being subject to web tension, and the ordered regions in the laminate relax, causing surface defects that are visible in or through the first surface layer. However, by having at least one roll at a temperature below the glass transition temperature of the material it is in contact with, at least a portion of the second surface layer material cools quickly in a more relaxed molecular configuration before tension on the web can force the molecules into a substantially more ordered state, and the relaxed configuration is maintained, at least in part, despite contact of the laminate with a subsequent, hotter roll, heating of the web as it leaves the roll stack, etc. Therefore, when the laminate is later applied to a substrate, the laminate material does not relax to a degree that would cause surface defects.

The optional third roll may have, in one embodiment, a temperature of about 115° C. to about 165° C. (about 240° F. to about 330° F.), e.g., less than or equal about 150° C. (about 300° F.). Optionally, the third roll may have a temperature of about 105° C. to about 130° C. (about 220° F. to about 260° F.). In one embodiment, the third roll comprises a rubber roll, which inhibits heat transfer to the laminate relative to a metal roll.

After leaving the calender roll stack 44, the laminate passes to an optional masking station. Optionally, there may be a heater at the entrance of the masking station 46 to facilitate the application and adhesion of a uniform masking film. One suitable kind of heater is an IR heater capable of providing up to about 8700 Joules per square meter of laminate. In one embodiment, an IR heater rated for 240 watt output may be positioned about 3 to about 7 inches (about 7.6 to about 17.8 cm) from the laminate, and may operate at a heater load of about 10 percent to about 70 percent of its rated output. The masking station 46 applies a masking material that is gel-free, streak-free unit and uniform gauge, to maintain a Class A surface on the post-thermoformed part. In one embodiment, the mask material may comprise a mono layer or multi-layer laminate of polyolefin material, e.g., polyethylene and/or metallocene-polymerized polyethylene. As shown in FIG. 3, the laminate 10 is drawn from the roll stack and from the masking station 46 by pull rolls 48. In a final step in the process, the laminate is collected by passing from pull rolls 48 to a finishing station 50 that may comprise a shearing device to cut the laminate into segments or 'sheets' of selected size. The finishing station may optionally comprise a stacking pallet 52 where the segments are stacked.

In alternative embodiments, the first surface layer may be extruded as the top layer of the laminate. In such case, the 'first surface roll' of the calender stack of FIG. 3 would be the uppermost roll.

It has been found that the laminate produced according to this invention may be hygroscopic, and that adsorbed water can introduce surface defects when the laminate is adhered to a substrate. Accordingly, the collected laminate may be sealed in a suitable moisture barrier material, e.g., in a hermetic, metal foil-containing laminated packaging material. For example, a stack of sheets of the laminate may be wrapped effectively by placing the stack on a foil-laminate moisture barrier wrapping material and an outer, protective sheet of about 5-mil (about 1 mm) low density polyethylene LDPE sheet material ("polywrap"). The sides of the stack may be wrapped with several layers of stretch wrap within which desiccant packs are placed. The moisture barrier can then be folded over the stack and vacuum-sealed. The protective LDPE may then be sealed over the moisture barrier. Such packaging is effective to maintain the moisture content of the laminate at less than or equal to about 1 weight percent (wt %) of the laminate plus moisture, or, more specifically, less than or equal to about 0.5 wt %, and still more specifically, less than or equal to about 0.2 wt %.

Turning now to FIG. 2, a sectional view of a formed article 20 can be seen. Formed article 20 comprises a multi-layer laminate 10 adhered or bonded to a substrate 8. Second surface layer 6 is adhered to the substrate 8 while simultaneously providing good adhesion to the middle layer 4 of multi-layer laminate 10.

The substrate 8 employed may be any of a variety of suitable compositions including but not limited to thermoset materials, thermoplastic materials, foamed materials, reinforced materials, and combinations thereof. Illustrative examples include polyurethane compositions including polyurethane foam and fiber reinforced polyurethane, polypropylene including fiber-reinforced polypropylene, polycarbonate/PBT blends and the like. Reinforcing fibers include carbon fibers, glass and the like.

In various embodiments, the substrate 8 may comprise reinforced thermoplastic polyurethane, foamed thermoplastic polyurethane, glass fiber-reinforced polyurethane, carbon fiber-reinforced polyurethane, foamed thermoplastic polyurethane, and combinations comprising at least one of the foregoing.

The bonding of second surface layer 6 to substrate 8 may result from molding, adhesives, chemical bonding, mechanical bonding, and the like, as well as combinations thereof. In one exemplary embodiment, the bonding of the second surface layer 6 to substrate 8 will result from the injection molding of a substrate 8 directly onto the second surface layer 6.

In various embodiments, a thermoformable multi-layer laminate 10 made according to this invention may be formed into various configurations, e.g., multi-layer laminate 10 of FIG. 1 may be formed into laminate 60 to conform to a mold 62. The multi-layer laminate 10 may be formed into a formed multi-layer laminate 60 by any one of a variety of methods, including but not limited to, thermoforming, compression forming, vacuum forming and the like.

Figure 5:
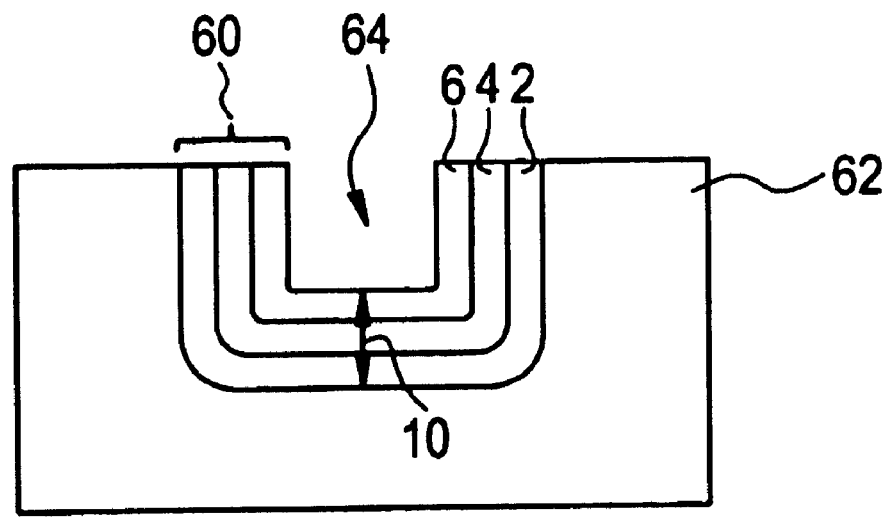

A laminate manufactured as described herein can be used to form an article having the surface quality provided by the laminate. Referring to FIGS. 5 and 6, this may be done by providing the disclosed multi-layer laminate 10; placing the multi-layer laminate 10 into a mold 62 so that a cavity 64 is formed behind or in back of second surface layer 6 of the multi-layer laminate 10; and placing a substrate 8 into the cavity 64 behind the multi-layer laminate 10 wherein the second surface layer 6 of the multi-layer laminate 10 bonds or is adhered to the substrate 8 to provide a formed article 20.

The disclosed method may further comprise cooling the formed article and/or removing the formed article 20 from the mold 62. In one embodiment, the formed article 20 is cooled and subsequently removed from the mold. Optionally, mold release is removed from article 20 and pigment is released from the article surface before the article is bonded to the substrate.

The placing of the substrate 8 into the cavity 64 may be done in a variety of ways, including injection molding, reaction injection molding, long fiber reinforced injection molding, and the like. In one embodiment, the substrate 8 is injected into the cavity 64 by reaction injection molding. In one embodiment, the substrate 8 is injected as a liquid and is then molded to form a semi-solid or solid substrate 8.

The molded article 20 is especially applicable for automotive parts including but not limited to exterior automotive panels such as door panels, roofs, hood panels, and the like.

As mentioned elsewhere herein, the disclosed method is not limited to the manufacture of the specific laminate described herein with reference to the figures, and various materials may be used in each of the laminate layers. The first surface layer of the laminate will generally comprise resorcinol arylate polyester chain members, and may optionally comprise a blend of polycarbonate resorcinol arylate polyester chain members.

"Resorcinol arylate polyester chain members" as used herein refers to chain members that comprise at least one aromatic diphenol residue in combination with at least one aromatic dicarboxylic acid residue. The diphenol residue, illustrated in Formula I, can be derived from a 1,3 dihydroxybenzene moiety, commonly referred to throughout this specification as resorcinol or resorcinol moiety. Resorcinol or resorcinol moiety as used herein should be understood to include both unsubstituted 1,3-dihydroxybenzene and substituted 1,3-dihydroxybenzene unless explicitly stated otherwise.

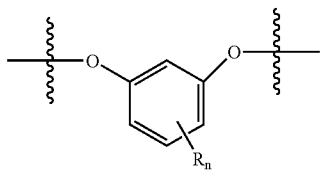

wherein R is at least one of C1-12 alkyl or halogen, and n is 0-3.

Suitable dicarboxylic acid residues include aromatic dicarboxylic acid residues derived from monocyclic moieties, (e.g., isophthalic acid, terephthalic acid, or mixtures thereof), and/or from polycyclic moieties (including diphenyl dicarbonxylic acid, diphenyl ether dicarboxylic acid, naphthalene dicarboxylic acid such as naphthalene-2,6-dicarboxylic acid, and morphthalene dicarbonxylic acid such as morphthalene 2,6-dicarbonxylic acid). In one embodiment, the dicarboxylic acid residue used will be 1,4-cyclohexanedicarboxylic acid residue.

In one embodiment, the aromatic dicarboxylic acid residues will be derived from mixtures of isophthalic and/or terephthalic acids as illustrated in Formula II.

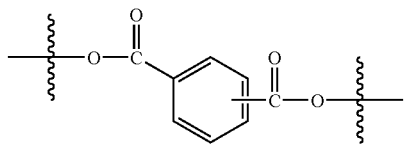

In another embodiment, a first surface layer may comprise a polymer as illustrated in Formula III wherein R and n are as previously defined:

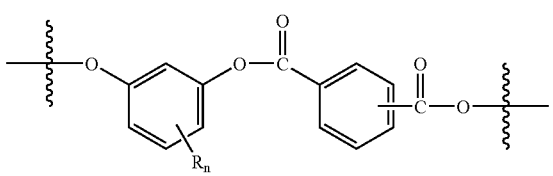

In another embodiment, a first surface layer may comprise a polymer having resorcinol arylate polyester chain members that are substantially free of anhydride linkages as are illustrated in Formula IV:

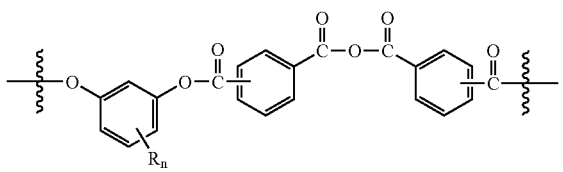

In still another embodiment, a first surface layer may comprise a polymer comprising resorcinol arylate polyester chain members made by an interfacial method comprising a first step of combining at least one resorcinol moiety and at least one catalyst in a mixture of water and at least one organic solvent substantially immiscible with water. Suitable resorcinol moieties comprise units of Formula V:

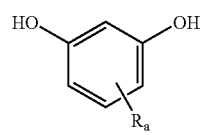

wherein R is at least one of $C_{1-12}$ alkyl or halogen, and n is 0-3. Alkyl groups, if present, can be straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl, with methyl being more suitable. Suitable halogen groups are bromo, chloro, and fluoro. The value for n may be 0-3, or, more specifically, 0-2, and even more specifically 0-1. The resorcinol moiety can be 2-methylresorcinol, or more specifically, the resorcinol moiety can be an unsubstituted resorcinol moiety in which n is zero.

In one exemplary embodiment, at least one catalyst will be combined with the reaction mixture used in the interfacial method of polymerization. Said catalyst may be present at a total level of about 0.1 to about 10 mole percent (mole %) or, more specifically, about 0.2 mole % to about 6 mole %, based on total molar amount of acid chloride groups. Suitable catalysts comprise tertiary amines, quaternary ammonium salts, quaternary phosphonium salts, hexaalkylguanidinium salts, and mixtures comprising at least one of the foregoing. Suitable tertiary amines include triethylamine, dimethylbutylamine, diisopropylethylamine, 2,2,6,6-tetramethylpiperidine, and mixtures thereof. Other contemplated tertiary amines include N—C1-C6-alkyl-pyrrolidines, such as N-ethylpyrrolidine, N—C1-C6-piperidines, such as N-ethylpiperidine, N-methylpiperidine, and N-isopropylpiperidine, N—C1-C6-morpholines, such as N-ethylmorpholine and N-isopropyl-morpholine, N—C1-C6-dihydroindoles, N—C1-C6-dihydroisoindoles, N—C1-C6-tetrahydroquinolines, N—C1-C6-tetrahydroisoquinolines, N—C1-C6-benzo-morpholines, 1-azabicyclo-[3.3.0]-octane, quinuclidine, N—C1-C6-alkyl-2-azabicyclo-[2.2.1]-octanes, N—C1-C6-alkyl-2-azabicyclo-[3.3.1]-nonanes, and N—C1-C6-alkyl-3-azabicyclo-[3.3.1]-nonanes, N,N,N',N'-tetraalkylalkylene-diamines, including N,N,N',N'-tetraethyl-1,6-hexanediamine. Particularly suitable tertiary amines are triethylamine and N-ethylpiperidine.

Suitable dicarboxylic acid dichlorides comprise aromatic dicarboxylic acid dichlorides derived from monocyclic moieties, e.g., isophthaloyl dichloride, terephthaloyl dichloride, or mixtures of isophthaloyl and terephthaloyl dichlorides, or from polycyclic moieties, including diphenyl dicarboxylic acid dichloride, diphenylether dicarboxylic acid dichloride, and naphthalene dicarboxylic acid dichloride, e.g., naphthalene-2,6-dicarboxylic acid dichloride; or from mixtures of monocyclic and polycyclic aromatic dicarboxylic acid dichlorides. The dicarboxylic acid dichloride can comprise mixtures of isophthaloyl and/or terephthaloyl dichlorides as typically illustrated in Formula VI.

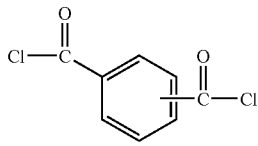

Either or both of isophthaloyl and terephthaloyl dichlorides may be used to make the polymer comprised in the first surface layer 2. In one embodiment, the dicarboxylic acid dichlorides comprise mixtures of isophthaloyl and terephthaloyl dichloride in a molar ratio of isophthaloyl to terephthaloyl of about 0.25 to about 4.0:1, in another embodiment, about 0.4 to about 2.5:1, and in yet another embodiment, about 0.67 to about 1.5:1.

Polymers comprising resorcinol arylate polyester chain members further comprise diblock, triblock, and multiblock copolyestercarbonates. The chemical linkages between blocks comprising resorcinol arylate chain members and blocks comprising organic carbonate chain members may comprise at least one of (a) an ester linkage between a suitable dicarboxylic acid residue of an arylate moiety and an —O—R$^5$—O— moiety of an organic carbonate moiety, for example as typically illustrated in Formula XII, wherein R is as previously defined:

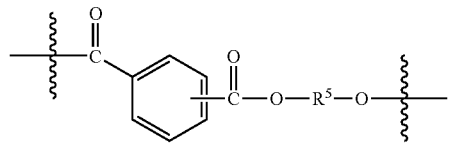

and (b) a carbonate linkage between a diphenol residue of a resorcinol arylate moiety and an organic carbonate moiety as shown in Formula XIII,

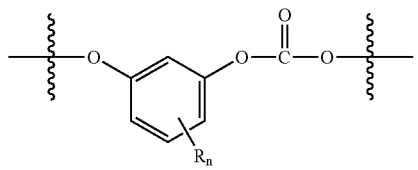

wherein R and n are as previously defined

The presence of a significant proportion of ester linkages of the type (a) may result in undesirable color formation in the copolyestercarbonates. Although the invention is not limited by theory, it is believed that color may arise, for example, when R$^5$ in Formula XII is bisphenol A and the moiety of Formula XII undergoes Fries rearrangement during subsequent processing and/or light-exposure. In one embodiment the copolyester carbonate is substantially comprised of a diblock copolymer with a carbonate linkage between resorcinol arylate block and an organic carbonate block. In another embodiment the copolyester carbonate is substantially comprised of a triblock carbonate-ester-carbonate copolymer with carbonate linkages between the resorcinol arylate block and organic carbonate end-blocks.

In one particular embodiment, a material comprising resorcinol arylate polyester chain members comprises an iso-terephthalic resorcinol (iso-terephthalic resorcinol/polycarbonate copolymer)/bisphenol A copolymer.

Materials suitable for use in an optional middle layer include any material that may comprise the first surface layer. Alternatively, or in addition thereto, a middle layer may comprise a copolyester carbonate; polycarbonate; polyarylcarbonate; one or more polyesters such as polyethylene terephthalate (PET), polybutylene terephthalate (PBT), polycyclohexylenedimethylene terephthalate (PCT), poly(1,4-cyclohexylenedimethylene-1,4-cyclohexanedicarboxylate) (PCCD), polyethylene terephthalate glycol (PETG), PCTG and PETG [poly(1,4-cyclohexanedimethanol-co-ethylene glycol) terephthalate] (note: PETG has >50% ethylene glycol, whereas PCTG has >50% 1,4-cyclohexanedimethanol) and the like; a thermoplastic polymer blend comprising polycarbonate and additional material comprising one or more of an acrylonitrile-styrene graft copolymer that is either acrylonitrile-styrene-acrylate graft polymer (ASA) and an arylonitrile-butadiene-styrene graft copolymer (ABS); polyamides; acrylates such as polymethyl methacrylates, polyethyl methacrylate, etc.; polyphthalate carbonate (PPC); polycarbonate ester (PCE); and/or a blend comprising any one or more of the foregoing. Optionally, a blend of polycarbonate with one or more such additional materials may comprise greater than or equal to about 50 wt % additional material(s), based on the total weight of the thermoplastic blend of the middle layer 4. Typically, a polycarbonate blend will comprise greater than or equal to about 5 wt % of an additional material, e.g., about 5 wt % to about 50 wt %, optionally, about 10 wt % to about 40 wt % additional material.

Illustrative examples of PPC and PCE are tertiary copolymers of polycarbonate, bisphenol A isophthalate, and bisphenol A terephthalate having the formula:

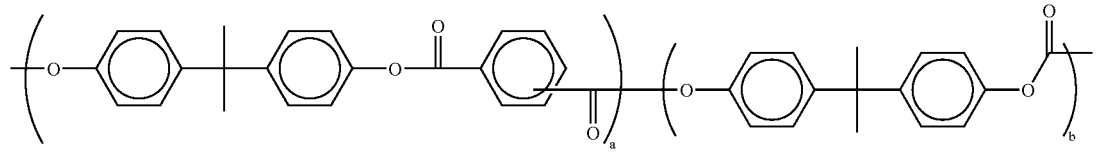

wherein a is an aromatic ester present in an amount of about 60 to about 80 wt % and b is a BPA carbonate present in an amount of about 20 to about 40 wt %, based on the total weight of the copolymer.

In one specific embodiment, the thermoplastic blend comprising the middle layer 4 will comprise PPC and a polycarbonate homopolymer prepared from bis-phenol-A and a carbonyl chloride precurser. For example, the PPC may be present in an amount of greater than or equal to about 5 wt %, based on the total weight of the thermoplastic blend of middle layer 4. In another embodiment, the PPC will be present in an amount of about 5 to about 40 wt %, based on the total weight of the thermoplastic blend of middle layer 4, while in one exemplary embodiment, the PPC will be present in an amount of about 20 to about 30 wt %, based on the total weight of the thermoplastic blend of middle layer 4.

In one embodiment, the polycarbonate or carbonate polymer will comprise aromatic polycarbonates and mixtures thereof. Generally, aromatic polycarbonates possess recurring structural units of the formula (I):

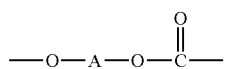
(I)

wherein A is a divalent aromatic radical of the dihydroxy compound employed in the polymer reaction. Polycarbonate prepared by melt polymerization frequently contains Fries product. A Fries product is a product of a Fries reaction. The terms "Fries reaction" and "Fries rearrangement" are used interchangeably herein, and refer to the amount of side chain branching measured as branching points. The Fries rearrangement is an undesirable side reaction that occurs during the preparation of polycarbonate using the melt process. The resultant Fries product serves as a site for branching of the polycarbonate chains, which affects flow and other properties of the polycarbonate. Although low levels of Fries products may be tolerated in polycarbonates, the presence of high levels may negatively affect performance characteristics of the polycarbonate such as toughness and moldability. The amount of Fries product may be determined by measuring the branching points via methanolysis followed by high-pressure liquid chromatography (HPLC).

The reactants utilized in the production of a polycarbonate by a polycondensation reaction are generally a dihydroxy compound and a carbonic acid diester. There is no particular restriction on the type of dihydroxy compound that may be employed. For example, bisphenol compounds represented by the general formula (II) below may be used

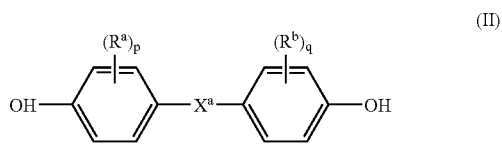
(II)

wherein $R^a$ and $R^b$ may be the same or different and wherein each represents a halogen atom or monovalent hydrocarbon group, and p and q are each independently integers from 0 to 4. X can represent one of the groups of formula (III):

(III)

wherein $R^c$ and $R^d$ each independently represent a hydrogen atom or a monovalent linear or cyclic hydrocarbon group and $R^e$ is a divalent hydrocarbon group. Examples of the types of bisphenol compounds that may be represented by formula (II) include the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl) propane, and the like; bis(hydroxyaryl)cycloalkane series such as, 1,1-bis(4-hydroxyphenyl)cyclopentane, 1,1-bis(4-hydroxyphenyl)cyclohexane, and the like; and the like, as well as combinations comprising at least one of the foregoing bisphenol compounds.

In a particular embodiment, bisphenol compound is bisphenol A. In addition, copolymeric polycarbonates may be manufactured by reacting at least two or more bisphenol compounds with the carbonic acid diesters.

Examples of the carbonic acid diester that may be utilized to produce the polycarbonates are diphenyl carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, and the like, as well as combinations comprising at least one of the foregoing carbonic acid diesters. A particularly suitable carbonic acid diester is diphenyl carbonate.

An additional example of a suitable dicarboxylic acid or ester is an alicyclic dicarboxylic acid or ester. As used herein the terms "alicyclic" and "cycloaliphatic radical" have the same meaning and refer to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

Acrylonitrile-butadiene-styrene (ABS) graft copolymers contain two or more polymeric parts of different compositions, which are bonded chemically. The graft copolymer can be prepared by first polymerizing a conjugated diene, such as butadiene or another conjugated diene, with a monomer copolymerizable therewith, such as styrene, to provide a polymeric backbone. After formation of the polymeric backbone, at least one grafting monomer, or, more specifically, two, are polymerized in the presence of the polymer backbone to obtain the graft copolymer.

For example, ABS may be made by one or more of emulsion or solution polymerization processes, bulk/mass, suspension and/or emulsion-suspension process routes. In addition, ABS materials may be produced by other process techniques such as batch, semi batch and continuous polymerization for reasons of either manufacturing economics or product performance or both.

The polymeric backbone can be a conjugated diene polymer such as polybutadiene, polyisoprene, or a copolymer, such as butadiene-styrene, butadiene-acrylonitrile, or the like.

The conjugated diene monomers normally utilized in preparing the polymeric backbone of the graft copolymer are described by the following formula (XIII):

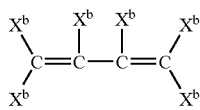

(XIII)

wherein $X^b$ is hydrogen, $C_1$-$C_5$ alkyl, chlorine, bromine, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing conjugated diene monomers, and the like. A particularly suitable conjugated diene monomer is butadiene.

One monomer or group of monomers that may be polymerized in the presence of the polymeric backbone are monovinylaromatic hydrocarbons. The monovinylaromatic monomers utilized are described by the following formula (XIV):

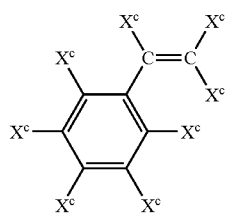

wherein $X^c$ is hydrogen, $C_1$-$C_{12}$ alkyl (including cycloalkyl), $C_6$-$C_{12}$ aryl, $C_7$-$C_{12}$ aralkyl, $C_7$-$C_{12}$ alkaryl, $C_1$-$C_{12}$ alkoxy, $C_6$-$C_{12}$ aryloxy, chlorine, bromine, or the like. Examples of the monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, mixtures comprising at least one of the foregoing compounds, and the like. Particularly, monovinylaromatic monomers can be styrene and/or alpha-methylstyrene.

A second group of monomers that may be polymerized in the presence of the polymeric backbone are acrylic monomers such as acrylonitrile, substituted acrylonitrile and/or acrylic acid esters, exemplified by acrylonitrile, and $C_1$-$C_7$ alkyl acrylates, such as methyl methacrylate, and the like.

The acrylonitrile, substituted acrylonitrile, or acrylic acid esters are described by the following formula (XV):

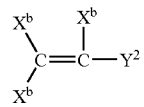

wherein $X^b$ is as previously defined and $Y^2$ is cyano, $C_1$-$C_{12}$ alkoxycarbonyl, or the like. Examples of such monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Particularly suitable monomers include acrylonitrile, ethyl acrylate, and methyl methacrylate.

Optionally, the polymeric backbone may be an acrylate rubber, such as the polymerization product of n-butyl acrylate, ethyl acrylate, 2-ethylhexyl acrylate, mixtures comprising at least one of the foregoing, and the like. Additionally, minor amounts of a diene may be copolymerized in the acrylate rubber backbone to yield improved grafting with the matrix polymer.

Styrene butadiene rubber or copolymers of butadiene rubbers with a glass transition temperature of lower than 0° C. are especially suitable.

Acrylonitrile-butadiene-styrene (ABS) graft copolymers are known in the art and many are commercially available, including, for example, the high-rubber acrylonitrile-butadiene-styrene resins available from General Electric Company as BLENDEX® grades 131, 336, 338, 360, and 415.

The second surface layer, which bonds to a substrate, may comprise any of the materials that may comprise the first surface layer. Alternatively, or in optional combination therewith, the second surface layer may comprise polycarbonate, polycarbonate blended with additional material such as an acrylonitrile-styrene graft copolymer (e.g., acrylonitrile-styrene-acrylate graft copolymer (ASA) and/or an acrylonitrile-butadiene-styrene graft copolymer (ABS)); and/or a blend of two or more of acrylonitrile-styrene-acrylate graft copolymer (ASA), acrylonitrile-butadiene-styrene graft copolymer (ABS) and styrene-acrylonitrile (SAN) copolymers; polyurethanes and blends of polyacrylates and polyurethanes.

In certain embodiments, the thermoplastic blend of the second surface layer 6 may comprise one or more ABS polymers or resins such as those commercially available from GE Plastics under the trade name CYCOLOY®. In one exemplary embodiment, the ABS polymer will be one or more of CYCOLOY® C1000HF, C1200, MC8800, MC8002, EXCY0076 with CYCOLOY® grades C1000HF, EXCY0076 and MC8002 being used in particularly exemplary embodiments, and EXCY0076 being used in an especially exemplary embodiment.

ASA polymers are in general terpolymers of acrylate, styrene, and acrylonitrile and typically contain a grafted crosslinked alkylacrylate rubber phase. Most ASA products consist of a two-phase system of a grafted elastomeric terpolymer, acrylate-styrene-acrylonitrile, dispersed in a glassy continuous matrix of styrene-acrylonitrile (SAN) copolymer. The graft typically consists of a polyalkylacrylate rubber core and grafted SAN shell, small amounts of styrene and acrylonitrile being grafted onto the rubber particles to compatibilize the two phases.

ASA is typically made by a three-step polymerization reaction. First the elastomeric component, typically a polyalkyl acrylate rubber or polyalkyl alkylacrylate rubber, is produced in a water-based emulsion or in a solution polymerization process. In the second stage, the styrene and acrylonitrile are copolymerized optionally with other monomers and grafted onto the elastomeric phase to achieve the desired compatibility. This stage can be performed either in emulsion, bulk/mass or via suspension and/or the emulsion-suspension process route. In the third stage, styrene and acrylonitrile (and, optionally, other monomers) are copolymerized, either simultaneously with the second (grafting) stage or separately in an independent operation, to form the rigid matrix. Again, this step may involve one or more of the following processes: emulsion, bulk or suspension. In addition, the ASA materials may be produced by other process techniques such as batch, semibatch and continuous polymerization for reasons of either manufacturing economics or product performance or both.

In one embodiment, suitable ASA polymers are prepared from poly (alkyl acrylate) rubber based ASA graft phase in combination with a vinyl aromatic/vinyl cyanide/vinyl carboxylic acid ester matrix phase. In one exemplary embodiment, the ASA polymers are a two-phase system. The two-phase system comprises an acrylate rubber substrate, e.g., poly (butyl acrylate) rubber, with a superstrate (or graft) copolymer of styrene-acrylonitrile (SAN) attached to it. This phase is commonly referred to as the "rubber graft phase" because the SAN is physically attached or grafted to the rubber through chemical reaction.

In one particular embodiment, a "rigid matrix phase" or continuous phase of MMASAN (a terpolymer of methyl methacrylate and styrene acrylonitrile) and PMMA (polymethylmethacrylate) is utilized. The rubber graft phase (or dispersed phase) is dispersed throughout the matrix phase of PMMA/MMASAN that forms the polymer continuum. The rubber interface is the surface forming the boundaries between the graft and matrix phases. The grafted SAN acts as a compatibilizer between the rubber and the matrix phase PMMA/MMASAN at this interface and prevents the separation of these two otherwise immiscible phases.

In another embodiment, the ASA polymers comprise about 10 wt % to about 40 wt % poly (butyl acrylate) rubber. In a second embodiment, about 15 weight percent (wt %) to about 30 wt %. In yet a third embodiment, about 15 wt % to about 25 wt % rubber.

In still another embodiment, the rubber graft phase comprises about 20 wt % poly (butyl acrylate) to about 70 wt % poly (butyl acrylate). In a particular embodiment, the rubber graft phase will comprise about 45 wt % poly (butyl acrylate) rubber and about 55 wt % SAN, with the SAN portion of the graft phase comprising about 65 wt % styrene and about 35 wt % acrylonitrile to about 75 wt % styrene and about 25 wt % acrylonitrile. In yet another embodiment, the SAN portion will comprise about 70 wt % to about 75 wt % styrene and about 25 wt % to about 30 wt % acrylonitrile.

In yet another embodiment, the MMASAN comprises 80 wt % MMA, 15 wt % styrene and 5 wt % acrylonitrile and in another embodiment, about 60 wt % MMA, 30 wt % styrene and 10 wt % acrylonitrile. In still another embodiment, the MMASAN comprises about 45 wt % methyl methacrylate, 40 wt % styrene and 15 wt % acrylonitrile. In one embodiment, the PMMA/MMASAN weight ratio in the matrix phase copolymer may be about 20/80 to about 80/20; and in another embodiment, about 25/75 to about 75/25, including 50/50.

The ASA polymer in one embodiment comprises a weight ratio of graft phase to matrix phase of about 15/85 to about 75/25, and in another embodiment, about 45 wt % graft phase and about 55 wt % matrix phase. The graft copolymer phase may be coagulated, blended and colloided with the matrix phase homopolymers, copolymers and/or terpolymers by the various blending processes that are well known in the art to form the ASA polymer blend.

In a particular embodiment, the thermoplastic blend of the second surface layer 6 will be a commercially available thermoplastic composition comprising a carbonate polymer, an ASA graft copolymer and an SAN copolymer. Suitable commercially available thermoplastic compositions are the GELOY™ brand thermoplastic composition available from General Electric Plastics of Washington, W.Va. In one embodiment, the second surface layer 6 will be at least one of GELOY™ HRA 150, HRA 170, XP7550, and mixtures thereof. In one particularly exemplary embodiment, the second surface layer 6 will comprise GELOY™ HRA 150.

Suitable SAN will generally have a weight average molecular weight of about 60,000 g/mole to about 200,000 g/mole, and in one embodiment, of about 90,000 g/mole to about 190,000 g/mole. SAN copolymers having a acrylonitrile (AN) content of about 15 wt % to about 40 wt %, based on the weight of the SAN copolymer, are particularly suitable, with SAN copolymers having about 20 wt % to about 35 wt % AN being used in another embodiment.

In one embodiment, the thermoplastic polymer of second surface layer 6 will comprise about 25% to about 80 wt % of the polycarbonate, about 10% to about 35 wt % of the ASA or ABS and about 10% to about 40 wt % of SAN based on the total weight of the second surface layer. In another embodiment, the thermoplastic polymer of second surface layer 6 will comprise about 40% to about 80 wt % of the polycarbonate, about 10% to about 30 wt % of the ASA or ABS and about 10% to about 30 wt % of SAN, based on the total weight of the second surface layer. In one exemplary embodiment, the thermoplastic polymer of second surface layer 6 will comprise about 40% to about 75 wt % of the polycarbonate, about 12% to about 30 wt % of the ASA or ABS and about 12% to about 30 wt % of SAN, based on the total weight of the second surface layer.

In one specific embodiment, the second surface layer 6 will comprise a thermoplastic polymer comprising a polycarbonate polymer, an ABS graft copolymer, an SAN copolymer and the SEENOX stabilizer. Such thermoplastic polymer blends are available from GE Plastics as CYCOLOY® EXCY0076.

In another embodiment, the second surface layer may comprise a blend of polyacrylate with polyurethane comprising, e.g., about 5 wt % to 15 wt % polyacrylate, based upon the weight of the blend. In a particular embodiment, the blend may comprise about 10 wt % polyacrylate.

Any one or more of the laminate layers can optionally comprise other components such as art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, fillers, and colorants such as metal flakes, glass flakes and beads, ceramic particles, other polymer particles, dyes and pigments which may be organic, inorganic or organometallic.

In one possible embodiment, the thermoplastic polymer of the second surface layer will comprise a stabilizer or stabithe Table, the entry for nip load shows the force applied at each end of the rolls in the first nip, which were 52 inches (132 cm) long. For example, in trial #1, 6000 lb$_f$ (26,700 N) was applied at each end of the rolls, for a total of 12,000 lb$_f$ (53,400 N), resulting in about 230 lb$_f$/in (about 404 N/cm).

TABLE

| Trial # | Nip Load (lb$_f$, 52" roll) | N/cm (=(lbf/in) × (4.45 N/lb$_f$)/2.54 cm/in)) = lb$_f$/in × 1.752 N-in/lb$_f$-cm | Roll-1 Temp °C. (° F.) | Roll-2 Temp °C. (° F.) | Roll-3 Temp °C. (° F.) | "Line Height" | "Line In/Out Position" |
|---|---|---|---|---|---|---|---|
| #1 | 2 × 6000 | 404 | 82° C. (180° F.) | 110° C. (230° F.) | 130° C. (265° F.) | 4.6 cm (=1$^{13}$/$_{16}$") above the centerline of roll stack | 11.7 cm (=4⅝" from the centerline of roll stack (this corresponds to the 7¾") |
| #2 | 2 × 14000 | 943 | 82° C. (180° F.) | 110° C. (230° F.) | 130° C. (265° F.) | 4.6 cm | 11.7 cm |
| #3 | 2 × 14000 | 943 | 127° C. (260° F.) | 110° C. (230° F.) | 130° C. (265° F.) | 4.6 cm | 11.7 cm |
| #4 | 2 × 6000 | 404 | 127° C. (260° F.) | 110° C. (230° F.) | 130° C. (265° F.) | 4.6 cm | 11.7 cm |
| #5 | 2 × 14000 | 943 | 82° C. (180° F.) | 121° C. (250° F.) | 130° C. (265° F.) | 4.6 cm | 11.7 cm |
| #6 | 2 × 6000 | 404 | 82° C. (180° F.) | 121° C. (250° F.) | 130° C. (265° F.) | 4.6 cm | 11.7 cm |
| #7 | 2 × 14000 | 943 | 127° C. (260° F.) | 121° C. (250° F.) | 130° C. (265° F.) | 4.6 cm | 11.7 cm |
| #8 | 2 × 6000 | 404 | 127° C. (260° F.) | 121° C. (250° F.) | 130° C. (265° F.) | 4.6 cm | 11.7 cm |
| #9 | 2 × 15000 | 1011 | 82° C. (180° F.) | 116° C. (240° F.) | 116° C. (240° F.) | 4.6 cm | 11.7 cm |
| #10 | 2 × 15000 | 1011 | 82° C. (180° F.) | 116° C. (240° F.) | 116° C. (240° F.) | 3 cm | 20 cm (=7⅞ inch) | lizer system. In one desirable embodiment, the stabilizer will comprise an alkylthioester. Optionally, the stabilizer may comprise a pentaerythritol tetrakis(beta-laurylthioproprionate) containing stabilizer and/or a pentaerythritol tetrakis (dodecylthioproprionate) containing stabilizer. An illustrative, commercially available example of a suitable alkylthioester based or containing stabilizer is SEENOX™ stabilizer, commercially available from Shipro Kasei Kashi Ltd.

The following examples will illustrate embodiments of the present disclosure and methods of manufacturing.

EXAMPLES

Example 1

A series of three-layer laminates was prepared on a production line. The laminates had a common laminate composition but were made subject to varying process conditions. Each laminate comprised a first surface layer comprising an isoterephthalic resorcinol/bisphenol A copolymer, a middle layer comprising polycarbonate and a second surface layer comprising a blend of GELOY™ polycarbonate, acrylonitrile-styrene-acrylate graft copolymer (ASA) and styrene-acrylonitrile copolymer (SAN). The laminate was extruded at temperatures between 260° C. and 277° C. (500° F. and 530° F.) to a film thickness of about 12.7 mm (about 0.5 inch). The first surface material was on the bottom of the laminate, in contact with the second calender roll; the second surface material was in contact with the first calender roll.

The nip load in the first nip of the roll stack, the calender roll temperatures, the line height, the die height and the die position relative to the nip were varied for purposes of comparison; the values of these parameters are set forth in the following Table. In each case, the line speed was 4.1 ft/min. In The results of the trials summarized in the foregoing Table were that trial numbers 1, 3, 4, 6-8, and 10 yielded laminates having unacceptable surface quality on the ITR-PC surface. The results of trial numbers 2, 5, and 9 were acceptable, with trial #9 being the best and providing a Class A surface.

A comparison of trial numbers 1, 4, 6, and 8 to trial numbers 2, 5, and 9 shows that an inadequate nip load can prevent the formation of an acceptable quality surface on the laminate. A comparison of trial numbers 3 and 7 to trial numbers 2, 5, and 9 shows that an excessive roll temperature can degrade the quality of the surface of the laminate and a comparison of trial 10 to trial 9 shows that the position of the die relative to the nip can also affect the quality of the laminate surface.

The data also confirm that in particular embodiments the temperature of the second surface roll (in this case, the first roll in the stack) should be less than 130° C. (226° F.), optionally less than about 90° C. (about 200° F.), e.g., the temperature of the second surface roll may be about 80° C. (about 180° F.), e.g., about 82° C. However, the temperature of the first surface roll (in this case, the second roll in the stack) may be above 90° C. (above about 200° F.), optionally about 110° C. to about 120° C. (about 230° F. to about 250° F.), e.g., about 115° C. (about 240° F.), but still less than or equal to about 130° C. The data also confirm that the temperature of the optional third roll may, in some embodiments, be less than 150° C., e.g., about 120° C. (about 250° F.), e.g., optionally about 115° C. to about 130° C. (about 240° F. to about 265° F.). The data further show that the nip load may be greater than or equal to about 400 N/cm (about 230 lb$_f$/in), optionally greater than or equal to about 940 N/cm (about 538 lb$_f$/in).

Further samples were prepared and tested as indicated above, except that the second surface layer comprised a blend of CYCOLOY™ polycarbonate, acrylonitrile-butadiene-styrene graft copolymer (ABS) and styrene-acrylonitrile copolymer (SAN). The results were consistent with those reported above.

Example 2

In another set of experiments similar to those in Example 1, the nip load in each case did not exceed about 400 N/cm (about 2×6000 lb/52 inches), the temperature of roll 1 was about 55° C. to about 80° C. (about 135° F. to about 175° F.), roll 2 and roll 3 was about 90° C. to about 118° C. (about 200° F. to about 245° F.), and the line height and line out position were the same as in the experiments of Example 1. None of the samples in this set of experiments produced a laminate with acceptable surface quality.

The method described herein can be used to produce a laminate having a first surface layer that may provide a superior quality surface, i.e., one having fewer or, more specifically, no brushlines, die lines or any other lines, and fewer or, more specifically, no point defects such as pinholes, voids, gels, black specs, etc., before and after thermoforming the laminate onto a substrate than was attained with laminates made according to the prior art. In one embodiment, the invention may be used to produce a laminate that provides a Class 'A' surface to the substrate. Optionally, the method may be employed to provide a laminate comprising one or more middle layers between the second surface layer and the first surface layer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making a laminate material, comprising a first surface layer comprising resorcinol arylate polyester chain members and a second surface layer suitable for bonding to a substrate, the method comprising:
    co-extruding a polymeric first surface layer material and a polymeric second surface layer material through a die and into the first nip of a calender roll stack comprising a first surface roll and a second surface roll that define the first nip, to form the laminate material;
    applying a nip load in the first nip of greater than or equal to about 400 N/cm onto the laminate; and
    collecting the laminate material from the calender roll stack;
    wherein the first surface layer comprises a material having a cleanliness level that yields less than or equal to about 2050 particulates per square meter in the first surface layer of the laminate, wherein the particulates have an average size, measured along the major axis of each particulate, of less than or equal to about 350 µm;
    wherein the first roll and the second roll each have a surface smoothness of less than or equal to about 5 micrometers and temperatures of about 40° C. to about 150° C.

2. The method of claim 1, wherein the first surface layer material comprises polycarbonate, polycarbonate copolymer, iso-terephthalic resorcinol/polycarbonate copolymer or a blend comprising one or more of the foregoing and the second surface layer comprises polycarbonate; polycarbonate blended with acrylonitrile-styrene graft copolymer; and/or a blend comprising one or more of acrylonitrile-styrene-acrylate graft copolymer (ASA), acrylonitrile-butadiene-styrene graft copolymer (ABS) and styrene-acrylonitrile (SAN) copolymers.

3. The method of claim 1, wherein the temperature of the second surface roll is less than or equal to about 90° C.

4. The method of claim 1, comprising applying a nip load in the first nip of about 400 N/cm to about 2600 N/cm.

5. The method of claim 4, wherein the nip load in the first nip is about 876 N/cm to about 1752 N/cm.

6. The method of claim 1, wherein the first surface layer material has an average melt temperature of about 235° C. to about 260° C. and the second surface layer material has an average melt temperature of about 225° C. to about 260° C.

7. The method of claim 1, comprising extruding a middle layer between the first surface layer and the second surface layer, the middle layer comprising at least one material from the group consisting of resorcinol arylate polyester chain members, polycarbonates, polycarbonate blended with acrylonitrile-styrene graft copolymer, and a blend of two or more of acrylonitrile-styrene-acrylate graft copolymer (ASA), acrylonitrile-butadiene-styrene graft copolymer (ABS) and styrene-acrylonitrile (SAN) copolymers, polyaryl carbonates, and polyesters; and
    wherein the middle layer material has an average melt temperature of about 200° C. to about 260° C.

8. The method of claim 1, comprising co-extruding a polymeric first surface layer material and a polymeric second surface layer material through an extrusion die having a die feedback temperature profile of about 255° C. to about 290° C.

9. The method of claim 8, wherein the second surface layer comprises a blend of acrylonitrile-styrene-acrylate graft copolymer (ASA), acrylonitrile-butadiene-styrene graft copolymer (ABS) and styrene-acrylonitrile (SAN) copolymers, and wherein the second surface layer side of the die has a temperature greater than about 260° C.

10. The method of claim 1, comprising setting the extrusion die line height of about 1.3 centimeter (cm) to about 5 cm.

11. The method of claim 1, wherein the calender rolls that define the first nip each have a surface smoothness of about 0.013 micrometers to about 5 micrometers.

12. The method of claim 1, wherein the calender roll stack comprises a third roll to define a second nip applying a nip load of 0 to about 2600 N/cm on the laminate.

13. The method of claim 12, wherein the temperature of the first surface roll is less than or equal to about 130° C. and the temperature of the third roll is less than or equal to about 150° C.

14. The method of claim 1, wherein the temperature of first surface roll is lower than the glass transition temperature of the first surface layer material.

15. The method of claim 1, further comprising heating the laminate as it is drawn from the calender roll stack.

16. The method of claim 1, further comprising passing the laminate to a masking station and applying a mask to the first surface layer, wherein the mask comprises a polyolefin material.

17. The method of claim 16, further comprising heating the laminate before applying the mask.

18. The method of claim 1, comprising running the first surface roll and the second surface roll at a relative roll speed of about 1:1 to about 1.2:1.

19. The method of claim 17, comprising running the first surface roll and the second surface roll at a relative roll speed of about 1.03:1 to about 1.06:1.

20. A method for making a laminate material, comprising:
co-extruding a polymeric first surface layer material comprising polycarbonate, polycarbonate copolymer, iso-terephthalic resorcinol/polycarbonate copolymer or a blend comprising one or more of the foregoing, and a second surface layer material comprising polycarbonate; polycarbonate blended with acrylonitrile-styrene graft copolymer; and/or a blend comprising one or more of acrylonitrile-styrene-acrylate graft copolymer (ASA), acrylonitrile-butadiene-styrene graft copolymer (ABS) and styrene-acrylonitrile (SAN) copolymers though a die and into the first nip of a calender roll stack comprising at least a first surface roll and a second surface roll to form a laminate, and a middle layer material between the first surface layer material and the second surface layer material, wherein the first surface layer material has a cleanliness level that provides less than or equal to about 2050 particulates per square meter in the laminate, the particulates having an average size, measured along the major axis of each particulate, of less than or equal to about 350 micrometers;
wherein the calender rolls in the calender roll stack have temperatures of about 40° C. to about 150° C. and that have a surface smoothness of less than or equal to about 5 micrometers;
applying a nip load in the first nip of greater than or equal to about 400 N/cm; and
collecting the laminate material from the calender roll stack.

21. The method of claim 20, wherein the second surface layer comprises polycarbonate; polycarbonate blended with acrylonitrile-styrene graft copolymer; and/or a blend of two or more of acrylonitrile-styrene-acrylate graft copolymer (ASA), acrylonitrile-butadiene-styrene graft copolymer (ABS) and styrene-acrylonitrile (SAN) copolymer.

22. The method of claim 20, wherein the middle layer comprises resorcinol arylate polyester chain members; polycarbonate; polyaryl carbonate; polyester; and/or a blend of two or more of acrylonitrile-styrene-acrylate graft copolymer (ASA), acrylonitrile-butadiene-styrene graft copolymer (ABS) and styrene-acrylonitrile (SAN) copolymer.

23. The method of claim 20, comprising applying a nip load in the first nip of about 876 N/cm to about 1752 N/cm.

24. The method of claim 20, wherein the average melt temperature of the first surface layer material is about 235° C. to about 260° C. and that average melt temperature of the second surface layer material is about 225° C. to about 260° C. and wherein the average melt temperature of the middle layer material is about 200° C. to about 260° C.

25. The method of claim 20, wherein the die temperature is about 255° C. to about 290° C.

26. The method of claim 20, wherein the second surface layer comprises a blend of acrylonitrile-styrene-acrylate graft copolymer (ASA), acrylonitrile-butadiene-styrene graft copolymer (ABS) and styrene-acrylonitrile (SAN) copolymers, and wherein the second surface layer side of the die has a temperature greater than about 260° C. (about 500° F.).

27. The method of claim 20, comprising setting the extrusion die line height at about 1.3 centimeter (cm) to about 5 cm.

28. The method of claim 20, the temperature of the second surface roll is less than or equal to about 90° C.

29. The method of claim 28, wherein the temperature of the first surface roll is less than or equal to about 130° C. and the temperature of the third roll is less than or equal to about 140° C.

30. The method of claim 20, wherein the roll temperature of the first surface roll is lower than the glass transition temperature of the first surface layer material.

31. The method of claim 20, further comprising heating the laminate as it is drawn from the roll stack.

32. The method of claim 20, further comprising passing the laminate to a masking station, applying a mask to the first surface layer and heating the laminate before applying the mask, wherein the mask comprises a polyolefin layer.

33. The method of claim 20, comprising running the first surface roll and the second surface roll at a relative roll speed of about 1:1 to about 1.2:1.

34. The method of claim 33, comprising running the first surface roll and the second surface roll at a relative roll speed of about 1.03:1 to about 1.06:1.

35. A method for making a laminate material comprising:
co-extruding a polymeric first surface layer material comprising resorcinol arylate polyester chain members and a polymeric second surface layer material suitable for bonding to a substrate through a die and into a first nip of a calender roll stack comprising a first surface roll and a second surface roll, to form a laminate material comprising a first surface layer and a second surface layer; and
applying a nip load in the first nip of about 400 N/cm or greater;
wherein the first surface layer comprises a material having a cleanliness level that yields less than or equal to about 2050 particulates per square meter in the first surface layer of the laminate, wherein the particulates have an average size, measured along the major axis of each particulate, of less than or equal to about 350 µm;
wherein the rolls defining the first nip in the roll stack each have a surface smoothness of less than or equal to about 5 micrometers;
drawing the laminate from the roll stack and heating the laminate as it leaves the roll stack;
passing the laminate to a masking station and applying a mask to the laminate to produce a masked laminate, wherein the mask comprises a polyolefin layer, and
cutting the masked laminate into segments.

36. The method of claim 35, wherein the first surface layer material comprises polycarbonate, polycarbonate copolymer, iso-terephthalic resorcinol/polycarbonate copolymer or a blend comprising one or more of the foregoing and the second surface layer comprises polycarbonate; polycarbonate blended with acrylonitrile-styrene graft copolymer; and/or a blend comprising one or more of acrylonitrile-styrene-acrylate graft copolymer (ASA), acrylonitrile-butadiene-styrene graft copolymer (ABS) and styrene-acrylonitrile (SAN) copolymers.

37. The method of claim 36, comprising coextruding a middle layer between the first layer and the second layer, the middle layer comprising at least one material from the group consisting of resorcinol arylate polyester chain members, polycarbonates, polycarbonate blended with acrylonitrile-styrene graft copolymer, and a blend of two or more of acrylonitrile-styrene-acrylate graft copolymer (ASA), acrylonitrile-butadiene-styrene graft copolymer (ABS) and styrene-acrylonitrile (SAN) copolymers, polyaryl carbonates, and polyesters.

* * * * *